US006604118B2

(12) United States Patent
Kleiman et al.

(10) Patent No.: US 6,604,118 B2
(45) Date of Patent: Aug. 5, 2003

(54) FILE SYSTEM IMAGE TRANSFER

(75) Inventors: Steven Kleiman, Los Altos; David Hitz, Portola Valley; Guy Harris, Mountain View; Sean O'Malley, Santa Clara, all of CA (US)

(73) Assignee: Network Appliance, Inc., Sunnyvale, CA (US)

( * ) Notice: Subject to any disclaimer, the term of this patent is extended or adjusted under 35 U.S.C. 154(b) by 0 days.

(21) Appl. No.: 09/127,497

(22) Filed: Jul. 31, 1998

(65) Prior Publication Data

US 2001/0044807 A1 Nov. 22, 2001

(51) Int. Cl.[7] .......................... G06F 12/00; G06F 17/30
(52) U.S. Cl. ........................................ 707/203; 707/204
(58) Field of Search ................................. 707/203, 204, 707/205, 100, 103, 104, 200, 201, 10, 101, 102, 104.1, 202

(56) References Cited

U.S. PATENT DOCUMENTS

| 3,813,529 | A | 5/1974 | Bartlett |
| 3,893,024 | A | 7/1975 | Reins et al. |
| 4,075,691 | A | 2/1978 | Davis et al. |
| 4,075,704 | A | 2/1978 | O'Leary |
| 4,156,907 | A | 5/1979 | Rawlings |
| 4,333,144 | A | 6/1982 | Whiteside |
| 4,351,023 | A | 9/1982 | Richer |
| 4,377,843 | A | 3/1983 | Garringer |
| 4,399,503 | A | 8/1983 | Hawley |
| 4,456,957 | A | 6/1984 | Schieltz |
| 4,459,664 | A | 7/1984 | Pottier |

(List continued on next page.)

FOREIGN PATENT DOCUMENTS

| EP | 0308506 A1 | 3/1987 |
| EP | 0321723 | 6/1989 |
| EP | 0359384 A2 | 6/1989 |
| EP | 0359384 B1 | 3/1990 |
| EP | 0359384 A3 | 3/1990 |
| EP | 0410630 A3 | 1/1991 |
| EP | 0453193 A3 | 10/1991 |
| EP | 0453193 A2 | 10/1991 |
| EP | 0462917 A2 | 12/1991 |
| EP | 0462917 A3 | 12/1991 |

(List continued on next page.)

OTHER PUBLICATIONS

AT & T—UNIX System V Release 4 Programmer's Guide: Streams No Date.
AT & T Bell Laboratories Technical Journal. vol. 63 No. 08. Part 02. Dated: Oct. 1984.
Bach, Maurice J. et al "The Design of the UNIX Operating System" 1986.
Beach, Richard J. "The Message is the Medium: Multiprocess Structuring of an Interactive Paint Program". pp.: 277–287 Jul. 1982.

(List continued on next page.)

Primary Examiner—Safet Metjahic
Assistant Examiner—Uyen Le
(74) Attorney, Agent, or Firm—Swernofsky Law Group PC

(57) ABSTRACT

The invention provides a method and system for duplicating all or part of a file system while maintaining consistent copies of the file system. The file server maintains a set of snapshots, each indicating a set of storage blocks making up a consistent copy of the file system as it was at a known time. Each snapshot can be used for a purpose other than maintaining the coherency of the file system, such as duplicating or transferring a backup copy of the file system to a destination storage medium. In a preferred embodiment, the snapshots can be manipulated to identify sets of storage blocks in the file system for incremental backup or copying, or to provide a file system backup that is both complete and relatively inexpensive.

12 Claims, 4 Drawing Sheets

U.S. PATENT DOCUMENTS

| | | |
|---|---|---|
| 4,488,231 A | 12/1984 | Yu et al. |
| 4,494,188 A | 1/1985 | Nakane |
| 4,527,232 A | 7/1985 | Bechtolsheim |
| 4,550,368 A | 10/1985 | Bechtolsheim |
| 4,589,067 A | 5/1986 | Porter et al. |
| 4,620,292 A | 10/1986 | Hagiwara |
| 4,685,125 A | 8/1987 | Zave |
| 4,710,868 A | 12/1987 | Cocke et al. |
| 4,719,569 A | 1/1988 | Ludemann |
| 4,742,447 A | 5/1988 | Duvall et al. |
| 4,742,450 A | 5/1988 | Duvall et al. |
| 4,761,737 A | 8/1988 | Duvall et al. |
| 4,761,785 A | 8/1988 | Clark et al. |
| 4,766,534 A | 8/1988 | DeBenedicts |
| 4,780,821 A | 10/1988 | Crossley |
| 4,783,730 A | 11/1988 | Fischer |
| 4,803,621 A | 2/1989 | Kelly |
| 4,814,971 A | 3/1989 | Thatte |
| 4,819,159 A | 4/1989 | Shipley et al. |
| 4,825,354 A | 4/1989 | Agrawal et al. ............ 364/200 |
| 4,827,411 A | 5/1989 | Arrowood |
| 4,845,609 A | 7/1989 | Lighthart et al. |
| 4,875,159 A | 10/1989 | Cary et al. |
| 4,878,167 A | 10/1989 | Kapulka et al. |
| 4,887,204 A | 12/1989 | Johnson et al. |
| 4,897,781 A | 1/1990 | Chang et al. |
| 4,914,583 A | 4/1990 | Weisshaar |
| 4,937,763 A | 6/1990 | Mott ......................... 364/550 |
| 4,965,772 A | 10/1990 | Daniel et al. |
| 4,969,118 A | 11/1990 | Montoye et al. |
| 4,984,272 A | 1/1991 | McIlroy et al. .............. 380/25 |
| 5,001,628 A | 3/1991 | Johnson et al. |
| 5,001,712 A | 3/1991 | Slipett et al. |
| 5,008,786 A | 4/1991 | Thatte |
| 5,018,144 A | 5/1991 | Corr et al. |
| 5,043,871 A | 8/1991 | Nishigaki |
| 5,043,876 A | 8/1991 | Terry |
| 5,049,873 A | 9/1991 | Robins et al. |
| 5,067,099 A | 11/1991 | McCown et al. ............ 364/550 |
| 5,088,081 A | 2/1992 | Farr |
| 5,107,500 A | 4/1992 | Wakamoto |
| 5,113,442 A | 5/1992 | Moir ........................... 380/25 |
| 5,134,619 A | 7/1992 | Henson et al. |
| 5,144,659 A | 9/1992 | Jones ........................... 380/4 |
| 5,155,835 A | 10/1992 | Belsan |
| 5,163,131 A | 11/1992 | Row et al. |
| 5,163,148 A | 11/1992 | Walls |
| 5,182,805 A | 1/1993 | Campbell |
| 5,195,100 A | 3/1993 | Katz et al. |
| 5,202,983 A | 4/1993 | Orita et al. .................. 395/600 |
| 5,208,813 A | 5/1993 | Stallmo |
| 5,218,695 A | 6/1993 | Noveck et al. |
| 5,218,696 A | 6/1993 | Baird et al. |
| 5,222,217 A | 6/1993 | Blount et al. ............... 395/325 |
| 5,235,601 A | 8/1993 | Stallmo et al. |
| 5,251,308 A | 10/1993 | Frank |
| 5,255,270 A | 10/1993 | Yanai et al. |
| 5,261,044 A | 11/1993 | Dev et al. |
| 5,274,799 A | 12/1993 | Brant et al. |
| 5,274,807 A | 12/1993 | Hoshen et al. |
| 5,276,840 A | 1/1994 | Yu |
| 5,276,867 A | 1/1994 | Kenley et al. |
| 5,278,838 A | 1/1994 | Ng et al. |
| 5,283,830 A | 2/1994 | Hinsley et al. .............. 380/25 |
| 5,297,265 A | 3/1994 | Frank et al. |
| 5,305,326 A | 4/1994 | Solomon et al. |
| 5,313,626 A | 5/1994 | Jones et al. |
| 5,313,646 A | 5/1994 | Hendricks |
| 5,313,647 A | 5/1994 | Kaufman |
| 5,315,602 A | 5/1994 | Noya et al. |
| 5,317,731 A | 5/1994 | Dias et al. |
| 5,319,780 A | 6/1994 | Catino et al. |
| 5,333,305 A | 7/1994 | Neufeld |
| 5,355,453 A | 10/1994 | Row et al. |
| 5,357,509 A | 10/1994 | Ohizumi |
| 5,357,612 A | 10/1994 | Alaiwan |
| 5,369,757 A | 11/1994 | Spiro et al. |
| 5,377,196 A | 12/1994 | Godlew et al. |
| 5,379,417 A | 1/1995 | Lui et al. |
| 5,430,729 A | 7/1995 | Rahnema |
| 5,448,718 A | 9/1995 | Cohn et al. |
| 5,452,444 A | 9/1995 | Solomon et al. |
| 5,454,095 A | 9/1995 | Kraemer et al. |
| 5,454,099 A | 9/1995 | Myers et al. |
| 5,463,642 A | 10/1995 | Gibbs et al. |
| 5,485,455 A | 1/1996 | Dobbins et al. |
| 5,490,248 A | 2/1996 | Dan et al. |
| 5,497,343 A | 3/1996 | Rarick |
| 5,502,836 A | 3/1996 | Hale et al. |
| 5,519,844 A | 5/1996 | Stallmo |
| 5,535,375 A | 7/1996 | Eshel et al. |
| 5,555,244 A | 9/1996 | Gupta et al. |
| 5,572,711 A | 11/1996 | Hirsch et al. ............... 395/500 |
| 5,574,843 A | 11/1996 | Gerlach, Jr. |
| 5,604,868 A | 2/1997 | Komine et al. |
| 5,617,568 A | 4/1997 | Ault et al. .................. 395/612 |
| 5,621,663 A | 4/1997 | Skagerling |
| 5,627,842 A | 5/1997 | Brown et al. |
| 5,628,005 A | 5/1997 | Hurvig |
| 5,630,060 A | 5/1997 | Tang et al. |
| 5,634,010 A | 5/1997 | Ciscon et al. |
| 5,642,501 A | 6/1997 | Doshi et al. |
| 5,644,718 A | 7/1997 | Belove et al. |
| 5,649,152 A | 7/1997 | Ohran et al. ................. 395/441 |
| 5,649,196 A | 7/1997 | Woodhill et al. ........... 395/620 |
| 5,666,353 A | 9/1997 | Klausmeier |
| 5,668,958 A | 9/1997 | Bendert et al. ............. 710/128 |
| 5,673,265 A | 9/1997 | Gupta et al. |
| 5,675,782 A | 10/1997 | Montague et al. .......... 395/609 |
| 5,678,006 A | 10/1997 | Valizadeh |
| 5,678,007 A | 10/1997 | Hurvig |
| 5,689,701 A | 11/1997 | Ault et al. .................. 395/610 |
| 5,694,163 A | 12/1997 | Harrison |
| 5,696,486 A | 12/1997 | Poliquin et al. |
| 5,721,916 A | 2/1998 | Pardikar ..................... 395/617 |
| 5,737,523 A | 4/1998 | Callaghan et al. ...... 395/187.01 |
| 5,740,367 A | 4/1998 | Spilo |
| 5,754,851 A | 5/1998 | Wissner |
| 5,758,347 A | 5/1998 | Lo et al. |
| 5,761,669 A | 6/1998 | Montague et al. .......... 707/103 |
| 5,819,292 A | 10/1998 | Hitz et al. .................. 707/203 |
| 5,825,877 A | 10/1998 | Dan et al. ........................ 380/4 |
| 5,826,102 A | 10/1998 | Escobar et al. |
| 5,828,839 A | 10/1998 | Moncreiff |
| 5,828,876 A | 10/1998 | Fish et al. |
| 5,854,893 A | 12/1998 | Ludwig et al. |
| 5,854,903 A | 12/1998 | Morrison et al. |
| 5,856,981 A | 1/1999 | Voelker |
| 5,857,207 A | 1/1999 | Lo et al. |
| 5,870,764 A | 2/1999 | Lo et al. .......................... 2/99 |
| 5,875,444 A | 2/1999 | Hughes |
| 5,876,278 A | 3/1999 | Cheng ........................ 454/184 |
| 5,890,959 A | 4/1999 | Pettit et al. ................. 454/184 |
| 5,907,672 A | 5/1999 | Matze et al. |
| 5,915,087 A | 6/1999 | Hammond et al. ..... 395/187.01 |
| 5,931,935 A | 8/1999 | Calbrera et al. ............ 710/260 |
| 5,948,110 A | 9/1999 | Hitz et al. |
| 5,950,225 A | 9/1999 | Kleiman |
| 5,956,491 A | 9/1999 | Marks |
| 5,956,712 A | 9/1999 | Bennett et al. |
| 5,957,612 A | 9/1999 | Bradley |

| | | | |
|---|---|---|---|
| 5,963,962 A | 10/1999 | Hitz et al. ............... 707/202 | |
| 5,983,364 A | 11/1999 | Bortcosh et al. | |
| 5,996,086 A | 11/1999 | Delaney et al. ............ 714/4 | |
| 5,996,106 A | 11/1999 | Seyyedy | |
| 6,000,039 A | 12/1999 | Tanaka et al. | |
| 6,026,402 A | 2/2000 | Vossen et al. | |
| 6,044,214 A | 3/2000 | Kimura et al. | |
| 6,067,541 A | 5/2000 | Raju et al. | |
| 6,070,008 A | 5/2000 | Korenshtein | |
| 6,073,089 A | 6/2000 | Baker et al. | |
| 6,076,148 A | 6/2000 | Kedem | |
| 6,078,932 A | 6/2000 | Haye et al. | |
| 6,085,234 A | 7/2000 | Pitts et al. | |
| 6,088,694 A | 7/2000 | Burns et al. | |
| 6,101,507 A * | 8/2000 | Cane et al. ............... 707/204 | |
| 6,101,585 A | 8/2000 | Brown | |
| H1860 H | 9/2000 | Asthana et al. | |
| 6,119,244 A | 9/2000 | Schoenthal | |
| 6,205,450 B1 | 3/2001 | Kanome | |
| 6,223,306 B1 * | 4/2001 | Silva et al. ............... 714/37 | |
| 2002/0049718 A1 | 4/2002 | Kleiman et al. | |
| 2002/0059172 A1 | 5/2002 | Muhlestein | |

FOREIGN PATENT DOCUMENTS

| | | | |
|---|---|---|---|
| EP | 0462917 B1 | 12/1991 | |
| EP | 0477039 A3 | 3/1992 | |
| EP | 0492808A A2 A3 | 7/1992 | |
| EP | 0497067 A1 | 8/1992 | |
| EP | 0559488 A2 | 9/1992 | |
| EP | 0537098 | 4/1993 | |
| EP | 0537198 B1 | 4/1993 | |
| EP | 0552580 A3 | 7/1993 | |
| EP | 0552580 A2 | 7/1993 | |
| EP | 0566967 A3 | 10/1993 | |
| EP | 0569313 A2 | 11/1993 | |
| EP | 1031928 A2 | 8/2000 | |
| JP | 1-273395 | 11/1989 | ............... 361/695 |
| WO | WO 89/03086 | 4/1989 | |
| WO | WO 91/13404 | 9/1991 | |
| WO | WO 92/00834 | 1/1992 | |
| WO | WO 91/13475 | 7/1993 | |
| WO | WO 94/29795 | 12/1994 | |
| WO | WO 94/29796 | 12/1994 | |
| WO | WO 94/29807 | 12/1994 | |
| WO | WO 98/38576 | 9/1998 | |
| WO | WO 99/30254 | 6/1999 | |
| WO | WO 99/45456 | 9/1999 | |
| WO | WO 99/46680 | 9/1999 | |
| WO | WO 99/66401 | 12/1999 | |
| WO | WO 00/07104 | 2/2000 | |
| WO | WO 00/11553 | 3/2000 | |
| WO | WO 00/68795 | 11/2000 | |
| WO | WO 02/29573 | 4/2002 | |
| WO | WO 02/44862 | 6/2002 | |

OTHER PUBLICATIONS

Britton, Diane E. & Mark E. Stockel. "An Interprocess Communication Facility for Distributed Applications". IEEE. 1980. pp.: 590–595.

Carlson, et al "HP AdvanceNet: A growth–Oriented Computer Networking Architecture Strategy". Hewlett–Packard Journal. Oct. 1986.

Carr, Robert & Dan Shafer. "The Power of PenPoint" 1991.

Cashin, P.M. "Inter–Process Communication" May 1980.

Chao, Chia et al "Mime: A High performance Storage Device With Strong Recovery Guarantees". Dated: Mar. 18, 1992.

Cheriton, David R. "The Thoth System: Multi–Process Structuring and the Thoth Operating System". 1979 pp.: 1–64.

Lantz, Keith A. et al "Rochester's Intelligent Gateway". IEEE. Oct. 1982.

Leffler, Samuel J. et al "The Design and Implementation of the 4.3 BSD UNIX Operating System" 1989.

Lieberman, Henry & Carl Hewitt. "A Real–Time Garbage Collector Based on the Lifetime of Objects". Communication of the ACM. vol. 26. No. 06. Dated: Jun. 1983.

Malcolm, Michael A. "A Process and Its Application". Dated: 1978.

Montoye R.K. et al Micoprocessors Session 3 WPM 3.4 "An 18ns 56–Bit Multiply–Adder Circuit". IEEE. Feb. 14, 1990.

Motorola, inc. "Microsystems Products Technical Data Sheet (1986), MicroMAP1–7, MicroMAP Manufacturing Automation Protocol Software".

Nelson, Bruce & Yu–Ping Cheng "The Myth of transfer Rate–How and Why SCSI is Better than IPI for NFS". Dated: Jul. 1992.

Nelson, Bruce et al "The Myth of MIPS for I/O–An Overview of Functional Multiprocessing for NFS Network Servers". Dated: Aug. 1992.

Nelson, Bruce "Benchmark Methodology and Preliminary Performance Specifications for the Auspex NS 5000 Network Server". Dated: Oct. 1989.

Network Applicance–Data ONTAP Event Management System. Aug. 10, 2000.

Hanson, Richard A. Experience With A Series/1 Distributed System. Apr. 1969.

Hartman, John H. & John K. Ousterhout. "The Zebra Striped Network File System" Faxed Oct. 27, 1993.

Hitz, David et al. "Using UNIX as One Component of a Lightweight Distributed Kernal for Multiprocessor File Server" 1990.

Hitz, David, James Lau, Michael Malcolm. "File System Design for an NFS File Server Appliance". Dated: Jan. 19, 1994.

Hitz, David. "A System Administrator's Performance Monitor for Tuning NFS Network Servers". Dated: May 1991.

Hitz, David. "Technical Report TR01: An NFS File Server Appliance". Rev. A 8/93.

IBM Technical Disclosure Bulletin. vol. 36 No. 3 Mar. 1993, "Parity Preservation for Redundant Array of Independent Direct Access Storage Device Data Loss Minimization and Repair".

Jones, Anita K. et al. "StarOS, a Multiprocessor Operator System for the Support of Task Forces" ACM 1979.

Kleiman."Using NUMA Interconnects for a Highly Available Filers". IEEE Micro. 1999. pp. 42–48.

Cheriton, David R. "The Thoth System: Multi–Process Structuring and Portability" 1982.

Cheriton, David R. et al "Troth, A Portable real–Time Operating System". pp.: 105–115 ACM Feb. 1979.

Chutani, Sailesh et al "The Episode File System". UNIX. Winter 1992. pp.: 43–60.

CIFS: Common Internet File System. UNIX Review. Feb. 1997.

Cohen, Jacques. "Garbage Collection of Linked Data Structures". Computing Surveys. vol. 13. No. 03. Dated: Sep. 1981.

Computer. IEEE. Sep. 1988.

De Jonge, Wiebren et al "The Logical Disk: A New Approach to Improving File Systems". pp.: 1–14 Faxed Oct. 27, 1993.

Deitel, Harvey M. "An Introduction to Operating Systems" 1984.

English, Robert M. & Alexander A Stepanov. 'Loge: A Self–Organizing Disk Controller. Dec. 1991, pp.: 1–15.

FLY–BY–XOR. Specification No Date.

Hammond, Richard A. "Experience With A Series/1 Distributed System". pp.: 585–589 IEEE 1980.

Network Interfaces Programmer's Guide. Sun Microsystems, Inc. 1992.

Optical Backplanes Driven By Sebring Rings Can Supply 40–160 Terabits/Sec of Wire–Speed Routing By 2002 Oct. 1999.

Optipat Document Delivery. Feb. 02, 2000. pp.: 02.

Osadzinski, Alex "The Network File System (NFS)" 1988.

Ousterhout, John & Fred Douglas "Beating the I/O Bottleneck: A Case for the Log–Structured File Systems" Oct. 1988.

Patterson, David A. et al "A Case For Redundant Arrays of Inexpensive Disks (RAID)" Jun. 1988.

Plum, Thomas "Reliable Data Structures In C" No Date.

Rashid, Richard F. et al "Accent: A Communication Oriented Network Operating System Kernal" ACM 1981.

Robertazzi, Thomas G. Computing Networks and Systems: Queueing Theory and performance Evaluatio No Date.

Row, John & Dvid Daugherty "Operating System Extensions Link Disparate Systems". Computer Design. Dated: Jul. 1984.

Row, John "Lan Software Links Diverse Mamchines, OS's" Mini–Micro Systems. Dated : Sep. 1985.

Sandberg, Russel "The SUN Network File System: Design, Implementation and Experience" Faxed Sep. 20, 1995.

Schroeder W. "PEACE: The Distributed Suprenum Operating System" 1988.

Schwartz, Allan M., David Hitz, & William M. Pitts. "LFS–A Local File System for Multiprocessor NFS Network Servers". Dated: Dec. 1989.

Sebring Rings in Networking. Aug. 09, 1999.

Sebring Theory of Ring Operation (STROP). Sep. 09, 1999.

Seltzer, Margo Ilene File System Performance and Transaction Support. 1992.

Session, Roger Class Construction in C and C++ Object–Oriented Programming Fundamentals. 1992.

Silberschatz, Abraham & James L. Peterson Operating System Concepts. 1989.

Sincoskie, W. David & David J. Farber The Series/1 Distributed Operating System: Description and Comments No Date.

SRC 6466 External Architecture Specification Rev. 0.7. May 05, 1999.

SRC 6466 Protocol Specification, Rev. 0.9, Draft. Aug. 16, 1999.

Stallings, William 5th Edition–Data and Computer Communications. 1997.

Stern, Hal "Managing NFS and NIS". O'Reilly & Associates, Inc. 1991.

Tan, See–Mong, Harvard Holmes, & Craig Eades. SOS–Stan's Own Server–A NFS File Server for the IBM PC Aug. 1988.

Tanenbaum, Andrew S. Operating Systems–Design and Implementation. 1987.

Tribby, David M. Network Services for HP Real–Time Computers. Hewlett–Packard Journal. Oct. 1996.

Tux 2: Slashdot.com TUX 2: The File System That Woulf Be King. Dated: Oct. 17 Printed Oct. 2000.

Tweten, David Hiding Mass Storage Under UNIX: NASA's MSS–II Architecture. IEEE. 1990.

UI–Atlas–Distributed Computing Architecture: A Technical Overview. Oct. 1991.

Usenix Association. Proceedings of the Winter 1992 Usenix Conference. San Francisco, CA. Jan. 20–24, 1992.

VRTX. C User's Guide. Jan. 1987.

VRTX32/68020 Versatile Real–Time Executive for the MC68020 Microprocessor. Dated: Apr. 1987.

Walton, Robert L. Rationale for a Queueable Object Distributed Interprocess Communication System. IEEE. 1982.

Wood, B.J. et al A Local–Area Network Architecture Based on message–Passing Operating System Concepts No Date.

Gray J. et al. "Parity Striping of Disc Arrays: Low–Cost Reliable Storage with Acceptable Throughput" Proceedings of the International Conference on the Very Large Databases. pp.: 148–161. Dated: Aug. 13, 1990.

Menon J. et al. "The Architecture of a Fault–Tolerant Cached Raid Controller" Proceedings of the Annual International Symposium on Computer Architecture. US. Los Alamitos. IEEE. Comp. Press. Soc. Press. vol. Symp. 20. pp.: 76–86. Dated: May 16, 1993. XP000398988.

Patent Abstract of Japan vol. 017. No. 621 Aug. 1993.

Bobrowski. "Protecting your data: overview and comparison of backup and recovery features in database servers." DBMS, vol. 6, No. 8, Jul. 1993, pp. 55–59.

Gray et al. "Transaction processing: concepts and techniques." 1993, Morgan Kaufmann, San Francisco, pp. 724–732.

Hutchinson et al. "Logical vs. physical file systems backup." Third Symposium on Operating Systems Design and Implementation, New Orleans, LA, USA, Feb. 22–25, 1999, pp. 239–249.

Jones. "Toasting the new appliance." LAN Magazine, Oct. 1995, pp. 170–173.

Molina et al., "Issues in diasater recovery." $35^{th}$ IEEE Computer Society International Conference, Feb. 26–Mar. 2, 1990, pp. 573–577.

* cited by examiner

FILE SYSTEM IMAGE TRANSFER

BACKGROUND OF THE INVENTION

1. Field of the Invention

The invention relates to storage systems.

2. Related Art

In computer file systems for storing and retrieving information, it is sometimes advantageous to duplicate all or part of the file system. For example, one purpose for duplicating a file system is to maintain a backup copy of the file system to protect against lost information. Another purpose for duplicating a file system is to provide replicas of the data in that file system available at multiple servers, to be able to share load incurred in accessing that data.

One problem in the known art is that known techniques for duplicating data in a file system either are relatively awkward and slow (such as duplication to tape), or are relatively expensive (such as duplication to an additional set of disk drives). For example, known techniques for duplication to tape rely on logical operations of the file system and the logical format of the file system. Being relatively cumbersome and slow discourages frequent use, resulting in backup copies that are relatively stale. When data is lost, the most recent backup copy might then be a day old, or several days old, severely reducing the value of the backup copy.

Similarly, known techniques for duplication to an additional set of disk drives rely on the physical format of the file system as stored on the original set of disk drives. These known techniques use an additional set of disk drives for duplication of the entire file system. Being relatively expensive discourages use, particularly for large file systems. Also, relying on the physical format of the file system complicates operations for restoring backup data and for performing incremental backup.

Accordingly, it would be desirable to provide a method and system for duplicating all or part of a file system, which can operate with any type of storage medium without either relative complexity or expense, and which can provide all the known functions for data backup and restore. This advantage is achieved in an embodiment of the invention in which consistent copies of the file system are maintained, so those consistent snapshots can be transferred at a storage block level using the file server's own block level operations.

SUMMARY OF THE INVENTION

The invention provides a method and system for duplicating all or part of a file system while maintaining consistent copies of the file system. The file server maintains a set of snapshots, each indicating a set of storage blocks making up a consistent copy of the file system as it was at a known time. Each snapshot can be used for a purpose other than maintaining the coherency of the file system, such as duplicating or transferring a backup copy of the file system to a destination storage medium. In a preferred embodiment, the snapshots can be manipulated to identify sets of storage blocks in the file system for incremental backup or copying, or to provide a file system backup that is both complete and relatively inexpensive.

DETAILED DESCRIPTION OF THE PREFERRED EMBODIMENT

In the following description, a preferred embodiment of the invention is described with regard to preferred process steps and data structures. However, those skilled in the art would recognize, after perusal of this application, that embodiments of the invention may be implemented using one or more general purpose processors (or special purpose processors adapted to the particular process steps and data structures) operating under program control, and that implementation of the preferred process steps and data structures described herein using such equipment would not require undue experimentation or further invention.

Inventions described herein can be used in conjunction with inventions described in the following applications:

application Ser. No. 08/471,218, filed Jun. 5, 1995, in the name of inventors David Hitz et al., titled "A Method for Providing Parity in a Raid Sub-System Using Non-Volatile Memory", attorney docket number NET-004; now U.S. Pat. No. 5,948,110;

application Ser. No. 08/454,921, filed May 31, 1995, in the name of inventors David Hitz et al., titled "Write Anywhere File-System Layout", attorney docket number NET-005; now U.S. Pat. No. 5,819,292;

application Ser. No. 08/464,591, filed May 31, 1995, in the name of inventors David Hitz et al., titled "Method for Allocating Files in a File System Integrated with a Raid Disk Sub-System", attorney docket number NET-006 now U.S. Pat. No. 6,038,570.

Each of these applications is hereby incorporated by reference as if fully set forth herein. They are collectively referred to as the "WAFL Disclosures."

File Servers and File System Image Transfer

Figure 1:
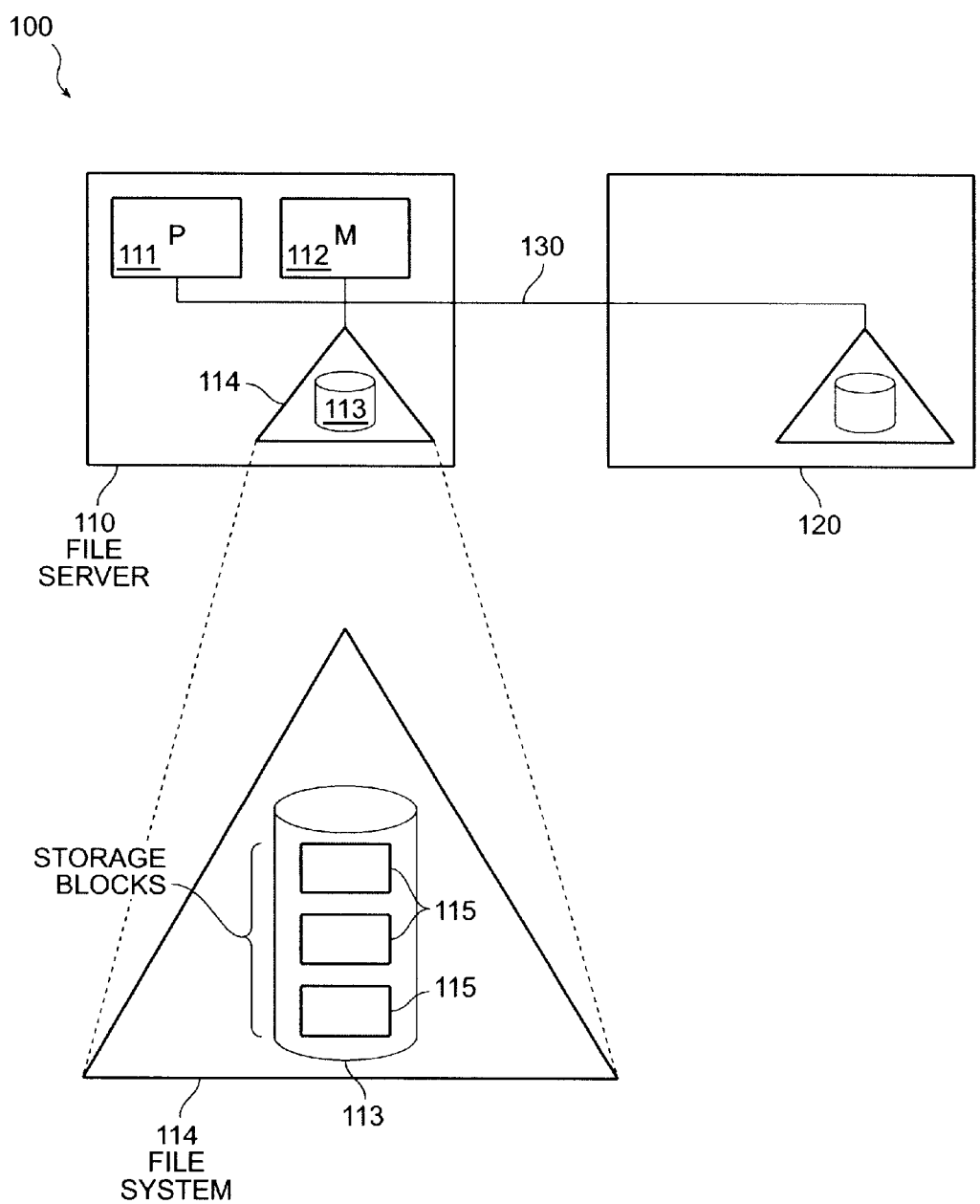
FIG. 1 shows a block diagram of a first system for file system image transfer.

FIG. 1 shows a block diagram of a system for file system image transfer.

A system 100 for file system image transfer includes a file server 110 and a destination file system 120.

The file server 110 includes a processor 111, a set of program and data memory 112, and mass storage 113, and preferably is a file server 110 like one described in the WAFL Disclosures. In a preferred embodiment, the mass storage 113 includes a RAID storage subsystem.

The destination file system 120 includes mass storage, such as a flash memory, a magnetic or optical disk drive, a tape drive, or other storage device. In a preferred embodiment, the destination file system 120 includes a RAID storage subsystem. The destination file system 120 can be coupled directly or indirectly to the file server 110 using a communication path 130.

In a first preferred embodiment, the destination file system 120 is coupled to the file server 110 and controlled by the processor 111 similarly to the mass storage 113. In this first preferred embodiment, the communication path 130 includes an internal bus for the file server 110, such as an I/O bus, a mezzanine bus, or other system bus.

In a second preferred embodiment, the destination file system 120 is included in a second file server 140. The second file server 140, similar to the first file server 110, includes a processor, a set of program and data memory, and mass storage that serves as the destination file system 120 with regard to the first file server 110. The second file server preferably is a file server like one described in the WAFL Disclosures. In this second preferred embodiment, the communication path 130 includes a network path between the first file server 110 and the second file server 140, such as a direct communication link, a LAN (local area network), a WAN (wide area network), a NUMA network, or another interconnect.

In a third preferred embodiment, the communication path 130 includes an intermediate storage medium, such as a tape, and the destination file system 120 can be either the first file server 110 itself or a second file server 140. As shown below, when the file server 110 selects a set of storage blocks for transfer to the destination file system 120, that set of storage blocks can be transferred by storing them onto the intermediate storage medium. At a later time, retrieving that set of storage blocks from the intermediate storage medium completes the transfer.

It is an aspect of the invention that there are no particular restrictions on the communication path 130. For example, a first part of the communication path 130 can include a relatively high-speed transfer link, while a second part of the communication path 130 can include an intermediate storage medium.

It is a further aspect of the invention that the destination file system 120 can be included in the first file server 110, in a second file server 140 110, or distributed among a plurality of file servers 110. Transfer of storage blocks from the first file server 110 to the destination file system 120 is thus completely general, and includes the possibility of a wide variety of different file system operations:

Storage blocks from the first file server 110 can be dumped to an intermediate storage medium, such as a tape or a second disk drive, retained for a period of time, and then restored to the first file server 110. Thus, the first file server 110 can itself be the destination file system.

Storage blocks from the first file server 110 can be transferred to a second file server 140, and used at that second file server 140. Thus, the storage blocks can be copied en masse from the first file server 110 to the second file server 140 110.

Storage blocks from the first file server 110 can be distributed using a plurality of different communication paths 130, so that some of the storage blocks are immediately accessible while others are recorded in a relatively slow intermediate storage medium, such as tape.

storage blocks from the first file server 110 can be selected from a complete file system, transferred using the communication path 130, and then processed to form a complete file system at the destination file system 120.

In alternative embodiments described herein, the second file server 140 can have a second destination file system. That second destination file system can be included within the second file server 140, or can be included within a third file server 110 similar to the first file server 110 or the second file server 140 110.

More generally, each $n^{th}$ file server can have a destination file system 120, either included within the $n^{th}$ file server, or included within an $n+1^{st}$ file server. The set of file servers can thus form a directed graph, preferably a tree with the first file server 110 as the root of that tree.

File System Storage Blocks

As described in the WAFL Disclosures, a file system 114 on the file server 110 (and in general, on the $n^{th}$ file server 110), includes a set of storage blocks 115, each of which is stored either in the memory 112 or on the mass storage 113. The file system 114 includes a current block map, which records which storage blocks 115 are part of the file system 114 and which storage blocks 115 are free.

As described in the WAFL Disclosures, the file system on the mass storage 113 is at all times consistent. Thus, the storage blocks 115 included in the file system at all times comprise a consistent file system 114.

As used herein, the term "consistent," referring to a file system (or to storage blocks in a file system), means a set of storage blocks for that file system that includes all blocks required for the data and file structure of that file system. Thus, a consistent file system stands on its own and can be used to identify a state of the file system at some point in time that is both complete and self-consistent.

As described in the WAFL Disclosures, when changes to the file system 114 are committed to the mass storage 113, the block map is altered to show those storage blocks 115 that are part of the committed file system 114. In a preferred embodiment, the file server 110 updates the file system frequently, such as about once each 10 seconds.

Snapshots

Figure 2:
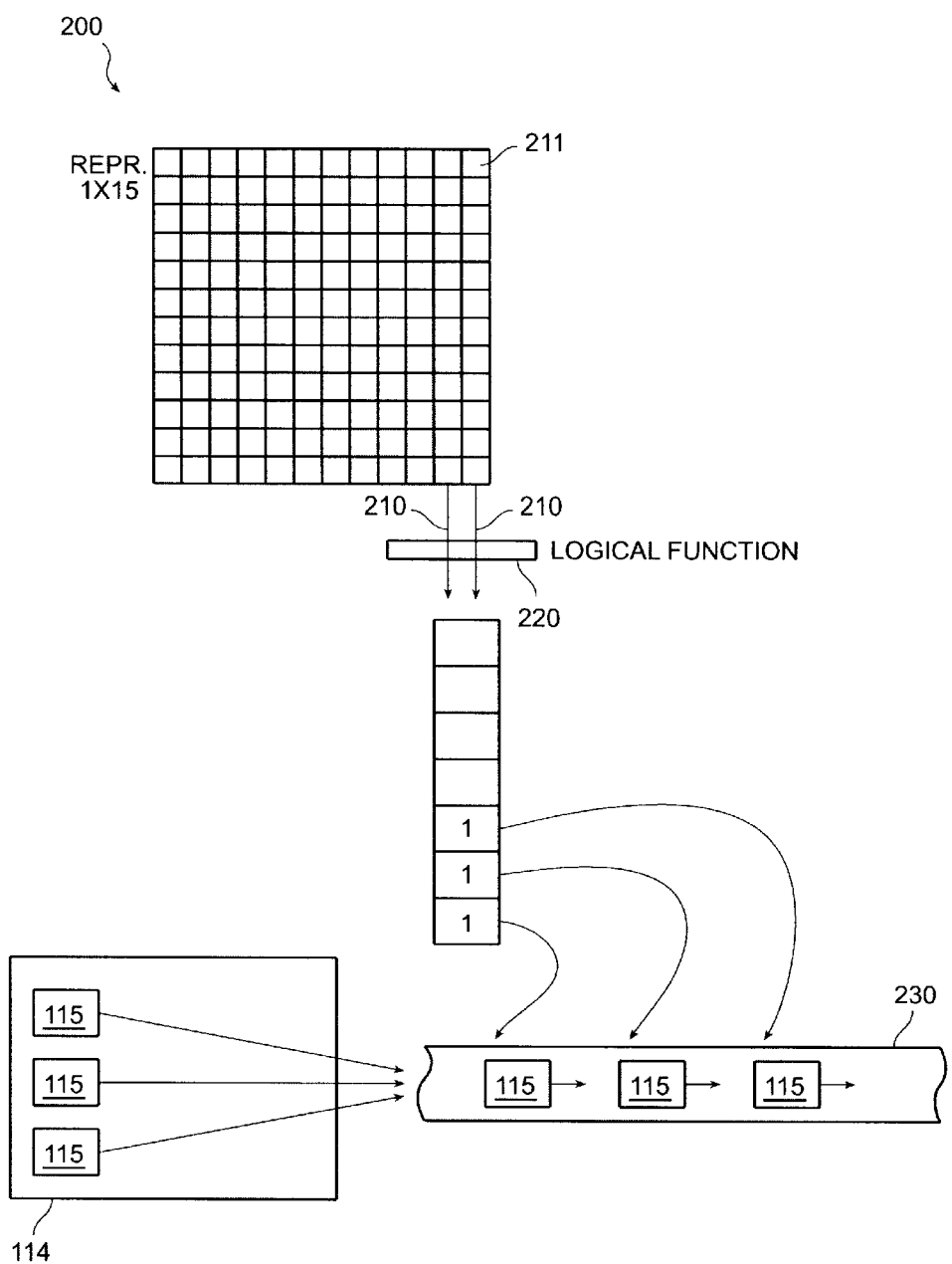
FIG. 2 shows a block diagram of a set of snapshots in a system for file system image transfer.

FIG. 2 shows a block diagram of a set of snapshots in a system for file system image transfer.

As used herein, a "snapshot" is a set of storage blocks, the member storage blocks forming a consistent file system, disposed using a data structure that allows for efficient set management. The efficient set management can include time efficiency for set operations (such as logical sum, logical difference, membership, add member, remove member). For example, the time efficiency can include O(n) time or less for n storage blocks. The efficient set management can also include space efficiency for enumerating the set (such as association with physical location on mass storage or inverting the membership function). The space efficiency can mean about 4 bytes or less per 4K storage block of disk space, a ratio about 1000:1 better than duplicating the storage space.

As described herein, the data structure for the snapshot is stored in the file system so there is no need to traverse the file system tree to recover it. In a preferred embodiment, each snapshot is stored as a file system object, such as a blockmap. The blockmap includes a bit plane having one bit for each storage block, other than bits used to identify if the storage block is in the active file system.

Moreover, when the file system is backed-up, restored, or otherwise copied or transferred, the blockmap within the file system is as part of the same operation itself also backed-up, restored, or otherwise copied or transferred. Thus, operations on the file system inherently include preserving snapshots.

Any particular snapshot can be transferred by any communication technique, including transfer using storage in an intermediate storage medium (such as nonvolatile memory, tape, disk in the same file system, disk in a different file system, or disk distributed over several file systems);

transfer using one or more network messages, transfer using communication within a single file server or set of file servers (such as for storage to disk in the same file system, to disk in a different file system, or to disk distributed over several file systems).

A collection 200 of snapshots 210 includes one bit plane for each snapshot 210. Each bit plane indicates a set of selected storage blocks 115. In the figure, each column indicates one bit plane (that is, one snapshot 210), and each row indicates one storage block 115 (that is, the history of that storage block 115 being included in or excluded from successive snapshots 210). At the intersection of each column and each row there is a bit 211 indicating whether that particular storage block 115 is included in that particular snapshot 210.

Each snapshot 210 comprises a collection of selected storage blocks 115 from the file system 114 that formed all or part of the (consistent) file system 114 at some point in time. A snapshot 210 can be created based on to the block map at any time by copying the bits from the block map indicating which storage blocks 115 are part of the file system 114 into the corresponding bits 211 for the snapshot 210.

Differences between the snapshots 210 and the (active) file system 114 include the following:

- The file system 114 is a consistent file system 114 that is being used and perhaps modified, while the snapshots 210 represent copies of the file system 114 that are read-only.
- The file system 114 is updated frequently, while the snapshots 210 represent copies of the file system 114 that are from the relatively distant past.
- There is only one active file system 114, while there can be (and typically are) multiple snapshots 210.

At selected times, the file server 110 creates a new bit plane, based on the block map, to create a new snapshot 210. As described herein, snapshots 210 are used for backup and mirroring of the file system 114, so in preferred embodiments, new snapshots 210 are created at periodic times, such as once per hour, day, week, month, or as otherwise directed by an operator of the file server 110.

Storage Images and Image Streams

As used herein a "storage image" includes an indicator of a set of storage blocks selected in response to one or more snapshots. The technique for selection can include logical operations on sets (such as pairs) of snapshots. In a preferred embodiment, these logical operations can include logical sum and logical difference.

As used herein, an "image stream" includes a sequence of storage blocks from a storage image. A set of associated block locations for those storage blocks from the storage image can be identified in the image stream either explicitly or implicitly. For a first example, the set of associated block locations can be identified explicitly by including volume block numbers within the image stream. For a second example, the set of associated block locations can be identified implicitly by the order in which the storage blocks from the storage image are positioned or transferred within the image stream.

The sequence of storage blocks within the image stream can be optimized for a file system operation. For example, the sequence of storage blocks within the image stream can be optimized for a backup or restore file system operation.

In a preferred embodiment, the sequence of storage blocks is optimized so that copying of an image stream and transfer of that image stream from one file server to another is optimized. In particular, the sequence of storage blocks is selected so that storage blocks identified in the image stream can be, as much as possible, copied in parallel from a plurality of disks in a RAID file storage system, so as to maximize the transfer bandwidth from the first file server.

A storage image 220 comprises a set of storage blocks 115 to be copied from the file system 114 to the destination file system 120.

The storage blocks 115 in the storage image 220 are selected so that when copied, they can be combined to form a new consistent file system 114 on the destination file system 120. In various preferred embodiments, the storage image 220 that is copied can be combined with storage blocks 115 from other storage images 220 (which were transferred at earlier times).

As shown herein, the file server 110 creates each storage image 220 in response to one or more snapshots 210.

An image stream 230 comprises a sequence of storage blocks 115 from a storage image 220. When the storage image 220 is copied from the file system 114, the storage blocks 115 are ordered into the image stream 230 and tagged with block location information. When the image stream 230 is received at the destination file system 120, the storage blocks 115 in the image stream 230 are copied onto the destination file system 120 in response to the block location information.

Image Addition and Subtraction

The system 100 manipulates the bits 211 in a selected set of storage images 220 to select sets of storage blocks 115, and thus form a new storage image 220.

For example, the following different types of manipulation are possible:

- The system 100 can form a logical sum of two storage images 220 A+B by forming a set of bits 211 each of which is the logical OR (A v B) of the corresponding bits 211 in the two storage images 220. The logical sum of two storage images 220 A+B is the union of those two storage images 220.
- The system 100 can form a logical difference of two storage images 220 A−B by 18 forming a set of bits 211 each of which is logical "1" only if the corresponding bit 211 A is logical "1" and the corresponding bit 211 B is logical "0" in the two storage images 220.

The logical sum of two storage images 220 A+B comprises a storage image 220 that includes storage blocks 115 in either of the two original storage images 220. Using the logical sum, the system 100 can determine not just a single past state of the file system 114, but also a history of past states of that file system 114 that were recorded as snapshots 210.

The logical difference of two selected storage images 220 A−B comprises just those storage blocks that are included in the storage image 220 A but not in the storage image 220 B. (To preserve integrity of incremental storage images, the subtrahend storage image 220 B is always a snapshot 210.) A logical difference is useful for determining a storage image 220 having a set of storage blocks forming an incremental image, which can be used in combination with full images.

In alternative embodiments, other and further types of manipulation may also be useful. For example, it may be useful to determine a logical intersection of snapshots 210, so as to determine which storage blocks 115 were not changed between those snapshots 210.

In further alternative embodiments, the system 100 may also use the bits 211 from each snapshot 210 for other purposes, such as to perform other operations on the storage blocks 115 represented by those bits 211.

Incremental Storage Images

As used herein, an "incremental storage image" is a logical difference between a first storage image and a second storage image.

As used herein, in the logical difference A−B, the storage image 220 A is called the "top" storage image 220, and the storage image 220 B is called the "base" storage image 220.

When the base storage image 220 B comprises a full set F of storage blocks 115 in a consistent file system 114, the logical difference A−B includes those incremental changes to the file system 114 between the base storage image 220 B and the top storage image 220 A.

Each incremental storage image 220 has a top storage image 220 and a base storage image 220. Incremental storage images 220 can be chained together when there is a sequence of storage images 220 $C_i$ where a base storage image 220 for each $C_i$ is a 18 top storage image 220 for a next $C_{i+1}$.

Examples of Incremental Images

For a first example, the system 100 can make a snapshot 210 each day, and form a level-0 storage image 220 in response to the logical sum of daily snapshots 210.

$$June3.level0 = June3 + June2 + June1$$

(June3, June2, and June1 are snapshots 220 taken on those respective dates.)

The June3.level0 storage image 220 includes all storage blocks 115 in the daily snapshots 210 June3, June2, and June1. Accordingly, the June3.level0 storage image 220 includes all storage blocks 115 in a consistent file system 114 (as well as possibly other storage blocks 115 that are unnecessary for the consistent file system 114 active at the time of the June3 snapshot 210).

In the first example, the system 100 can form an (incremental) level-1 storage image 220 in response to the logical sum of daily snapshots 210 and the logical difference with a single snapshot 210.

$$June5.level1 = June5 + June4 - June3$$

(June5, June4 and June3 are snapshots 220 taken on those respective dates.)

It is not required to subtract the June2 and June1 snapshots 210 when forming the June5.level1 storage image 220. All storage blocks 115 that the June5 snapshot 210 and the June4 snapshot 210 have in common with either the June2 snapshot 210 or the June1 snapshot 210, they will necessarily have in common with the June3 snapshot 210. This is because any storage block 115 that was part of the file system 114 on June2 or June1, and is still part of the file system 114 on June5 or June4, must have also been part of the file system 114 on June3.

In the first example, the system 100 can form an (incremental) level-2 storage image 220 in response to the logical sum of daily snapshots 210 and the logical difference with a single snapshot 210 from the time of the level-1 base storage image 220.

$$June7.level2 = June7 + June6 - June5$$

(June7, June6, and June5 are snapshots 210 taken on those respective dates.)

In the first example, the storage images 220 June3.level0, June5.level1, and June7.level2 collectively include all storage blocks 115 needed to construct a full set F of storage blocks 115 in a consistent file system 114.

For a second example, the system 100 can form a different (incremental) level-1 storage image 220 in response to the logical sum of daily snapshots 210 and the logical difference with a single snapshot 210 from the time of the level-0 storage image 220.

$$June9.level1 = June9 + June8 - June3$$

(June9, June8, and June3 are snapshots 210 taken on those respective dates.)

Similar to the first example, the storage images 220 June3.level0 and June9.level1 collectively include all storage blocks 115 needed to construct a full set F of storage blocks 115 in a consistent file system 114. There is no particular requirement that the June9.level1 storage image 220 be related to or used in conjunction with the June7.level2 storage image 220 in any way.

File System Image Transfer Techniques

To perform one of these copying operations, the file server 110 includes operating system or application software for controlling the processor 111, and data paths for transferring data from the mass storage 113 to the communication path 130 to the destination file system 120. However, the selected storage blocks 115 in the image stream 230 are copied from the file system 114 to the corresponding destination file system 120 without logical file system processing by the file system 114 on the first file server 110.

In a preferred embodiment, the system 100 is disposed to perform one of at least four such copying operations:

Volume Copying. The system 100 can be disposed to create an image stream 230 for copying the file system 114 to the destination file system 120.

The image stream 230 comprises a sequence of storage blocks 115 from a storage image 220. As in nearly all the image transfer techniques described herein, that storage image 220 can represent a full image or an incremental image:

Full image: The storage blocks 115 and the storage image 220 represent a complete and consistent file system 114.

Incremental image: The storage blocks 115 and the storage image 220 represent an incremental set of changes to a consistent file system 114, which when combined with that file system 114 form a new consistent file system 114.

The image stream 230 can be copied from the file server 110 to the destination file system 120 using any communication technique. This could include a direct communication link, a LAN (local area network), a WAN (wide area network), transfer via tape, or a combination thereof. When the image stream 230 is transferred using a network, the storage blocks 115 are encapsulated in messages using a network communication protocol known to the file server 110 and to the destination file system 120. In some network communication protocols, there can be additional messages between the file server 110 and to the destination file system 120 to ensure the receipt of a complete and correct copy of the image stream 230.

The destination file system 120 receives the image stream 230 and identifies the storage blocks 115 from the mass storage 113 to be recorded on the destination file system 120.

When the storage blocks 115 represent a complete and consistent file system 114, the destination file system 120 records that file system 114 without logical change. The destination file system 120 can make that file system 114 available for read-only access by local processes. In alternative embodiments, the destination file system 120 may make that file system 114 available for access by local processes, without making changes by those local processes available to the file server 110 that was the source of the file system 114.

When the storage blocks 115 represent an incremental set of changes to a consistent file system 114, the destination file system 120 combines those changes with that file system 114 form a new consistent file system 114. The destination file system 120 can make that new file system 114 available for read-only access by local processes.

In embodiments where the destination file system 120 makes the transferred file system 114 available for access by local processes, changes to the file system 114 at the destination file system 120 can be flushed when a subsequent incremental set of changes is received by the destination file system 120.

All aspects of the file system 114 are included in the image stream 230, including file data, file structure hierarchy, and file attributes. File attributes preferably include NFS attributes, CIFS attributes, and those snapshots 210 already maintained in the file system 114.

Disk Copying. In a first preferred embodiment of volume copying (herein called "disk copying"), the destination file system 120 can include a disk drive or other similar accessible storage device. The system 100 can copy the storage blocks 115 from the mass storage 113 to that accessible storage device, providing a copy of the file system 114 that can be inspected at the current time.

When performing disk copying, the system 100 creates an image stream 230, and copies the selected storage blocks 115 from the mass storage 113 at the file server 110 to corresponding locations on the destination file system 120. Because the mass storage 113 at the file server 110 and the destination file system 120 are both disk drives, copying to corresponding locations should be simple and effective.

It is possible that locations of storage blocks 115 at the mass storage 113 at the file server 110 and at the destination file system 120 do not readily coincide, such as if the mass storage 113 and the destination file system 120 have different sizes or formatting. In those cases, the destination file system 120 can reorder the storage blocks 115 in the image stream 230, similar to the "Tape Backup" embodiment described herein.

Tape Backup. In a second preferred embodiment of volume copying (herein called "tape backup"), the destination file system 120 can include a tape device or other similar long-term storage device. The system 100 can copy storage blocks 115 from the mass storage 113 to that long-term storage device, providing a backup copy of the file system 114 that can be restored at a later time.

When performing tape backup, the system 100 creates an image stream 230, and copies the selected storage blocks 115 from the mass storage 113 at the file server 110 to a sequence of new locations on the destination file system 120. Because the destination file system 120 includes one or more tape drives, the system 100 creates and transmits a table indicating which locations on the mass storage 113 correspond to which other locations on the destination file system 120.

Similar to transfer of an image stream 230 using a network communication protocol, the destination file system 120 can add additional information to the image stream 230 for recording on tape. This additional information can include tape headers and tape gaps, blocking or clustering of storage blocks 115 for recording on tape, and reformatting of storage blocks 115 for recording on tape.

File Backup. In a third preferred embodiment of volume copying (herein called "file backup"), the image stream 230 can be copied to a new file within a file system 114, either at the file server 110 or at a file system 114 on the destination file system 120.

Similar to tape backup, the destination file system 120 can add additional information to the image stream 230 for recording in an file. This additional information can include file metadata useful for the file system 114 to locate storage blocks 115 within the file.

Volume Mirroring. The system 100 can be disposed to create image streams 230 for copying the file system 114 to the destination file system 120 coupled to a second file server 110 on a frequent basis, thus providing a mirror copy of the file system 114.

In a preferred embodiment, the mirror copy of the file system 114 can be used for takeover by a second file server 110 from the first file server 110, such as for example if the first file server 110 fails.

When performing volume mirroring, the system 100 first transfers an image stream 230 representing a complete file system 114 from the file server 110 to the destination file system 120. The system 100 then periodically transfers image streams 230 representing incremental changes to that file system 114 from the file server 110 to the destination file system 120. The destination file system 120 is able to reconstruct a most recent form of the consistent file system 114 from the initial full image stream 230 and the sequence of incremental image streams 230.

It is possible to perform volume mirroring using volume copying of a full storage image 230 and a sequence of incremental storage images 230. However, determining the storage blocks 115 to be included in an incremental storage images 230 can take substantial time for a relatively large file system 114, if done by logical subtraction.

As used herein, a "mark-on-allocate storage image" is a subset of a snapshot, the member storage blocks being those that have been added to a snapshot that originally formed a consistent file system.

In a preferred embodiment, rather than using logical subtraction, as described above, at the time the incremental storage images 230 is about to be transferred, the file server 110 maintains a separate "mark-on-allocate" storage image 230. The mark-on-allocate storage image 230 is constructed by setting a bit for each storage block 115, as it is added to the consistent file system 114. The mark-on-allocate storage image 230 does not need to be stored on the mass storage 113, included in the block map, or otherwise backed-up; it can be reconstructed from other storage images 230 already at the file server 110.

When an incremental storage image 230 is transferred, a first mark-on-allocate storage image 230 is used to determine which storage blocks 115 to include in the storage image 230 for transfer. A second mark-on-allocate storage image 230 is used to record changes to the file system 114 while the transfer is performed. After the transfer is performed, the first and second mark-on-allocate storage images 230 exchange roles.

Full Mirroring. In a first preferred embodiment of volume mirroring (herein called "full mirroring"), the destination file system 120 includes a disk drive or other similar accessible storage device.

Upon the initial transfer of the full storage image 230 from the file server 110, the destination file system 120 creates a copy of the consistent file system 114. Upon the sequential transfer of each incremental storage image 230 from the file server 110, the destination file system 120 updates its copy of the consistent file system 114. The destination file system 120 thus maintains its copy of the file system 114 nearly up to date, and can be inspected at any time.

When performing full mirroring, similar to disk copying, the system 100 creates an image stream 230, and copies the selected storage blocks 115 from the mass storage 113 at the file server 110 to corresponding locations on the destination file system 120.

Incremental Mirroring. In a second preferred embodiment of volume mirroring (herein called "incremental mirroring"), the destination file system 120 can include both (1) a tape device or other relatively slow storage device, and (2) a disk drive or other relatively fast storage device.

As used herein, an "incremental mirror" of a first file system is a base storage image from the first file system, and at least one incremental storage image from the first file system, on two storage media of substantially different types. Thus, a complete copy of the first file system can be reconstructed from the two or more objects.

Upon the initial transfer of the full storage image 230 from the file server 110, the destination file system 120 copies a complete set of storage blocks 115 from the mass storage 113 to that relatively slow storage device. Upon the sequential transfer of each incremental storage image 230 from the file server 110, the destination file system 120 copies incremental sets of storage blocks 115 from the mass storage 113 to the relatively fast storage device. Thus, the full set of storage blocks 115 plus the incremental sets of storage blocks 115 collectively represent an up-to-date file system 114 but do not require an entire duplicate disk drive.

When performing incremental mirroring, for the base storage image 230, the system 100 creates an image stream 230, and copies the selected storage blocks 115 from the mass storage 113 at the file server 110 to a set of new locations on the relatively slow storage device. The system 100 writes the image stream 230, including storage block location information, to the destination file system 120. In a preferred embodiment, the system 100 uses a tape as an intermediate destination storage medium, so that the base storage image 230 can be stored for a substantial period of time without having to occupy disk space.

For each incremental storage image 230, the system 100 creates a new image stream 230, and copies the selected storage blocks 115 from the mass storage 113 at the file server 110 to a set of new locations on the accessible storage device. Incremental storage images 230 are created continuously and automatically at periodic times that are relatively close together.

The incremental storage images 230 are received at the destination file system 120, which unpacks them and records the copied storage blocks 115 in an incremental mirror data structure. As each new incremental storage image 230 is copied, copied storage blocks 115 overwrite the equivalent storage blocks 115 from earlier incremental storage images 230. In a preferred embodiment, the incremental mirror data structure includes a sparse file structure including only those storage blocks 115 that are different from the base storage image 230.

In a preferred embodiment, the incremental storage images 230 are transmitted to the destination file system 120 with a data structure indicating a set of storage blocks 115 that were deallocated (that is, removed) from the file system on the file server 110. Thus, the images are mark-on-deallocate images of the storage blocks. In response to this data structure, the destination file system 120 removes those indicated storage blocks 115 from its incremental mirror data structure. This allows the destination file system 120 to maintain the incremental mirror data structure at a size no larger than approximately the actual differences between a current file system at the file server 110 and the base storage image 230 from the file server 110.

Consistency Points. When performing either full mirroring or incremental mirroring, it can occur that the transfer of a storage image 230 takes longer than the time needed for the file server 110 to update its consistent file system 114 from a first consistency point to a second consistency point. Consistency points are described in further detail in the WAFL Disclosures.

In a preferred embodiment, the file server 110 does not attempt to create a storage image 230 and to transfer storage blocks 115 for every consistency point. Instead, after a transfer of a storage image 230, the file server 110 determines the most recent consistency point (or alternatively, determines the next consistency point) as the effective next consistency point. The file server 110 uses the effective next consistency point to determine any incremental storage image 230 for a next transfer.

Volume Replication. The destination file system 120 can include a disk drive or other accessible storage device.

The system 100 can copy storage blocks from the mass storage 113 to that accessible storage device at a signal from the destination file system 120, to provide replicated copies of the file system 114 for updated (read-only) use by other file servers 110.

The file server 110 maintains a set of selected master snapshots 210. A master snapshot 210 is a snapshot 210 whose existence can be known by the destination file system 120, so that the destination file system 120 can be updated with reference to the file system 114 maintained at the file server 110. In a preferred embodiment, each master snapshot 210 is designated by an operator command at the file server 110, and is retained for a relatively long time, such as several months or a year.

In a preferred embodiment, at a minimum, each master snapshot 210 is retained until all known destination file systems 120 have been updated past that master snapshot 210. A master snapshot 210 can be designated as a shadow snapshot 210, but in such cases destination file systems 120 are taken off-line during update of the master shadow snapshot 210. That is, destination file systems 120 wait for completion of the update of that master shadow snapshot 210 before they are allowed to request an update from that master shadow snapshot 210.

The destination file system 120 generates a message (such as upon command of an operator or in response to initialization or self-test) that it transmits to the file server 110, requesting an update of the file system 114. The message includes a newest master snapshot 210 to which the destination file system 120 has most recently synchronized. The message can also indicate that there is no such newest master snapshot 210.

The file server 110 determines any incremental changes that have occurred to the file system 114 from the newest master snapshot 210 at the destination file system 120 to the newest master snapshot 210 at the file server 110. In response to this determination, the file server 110 determines a storage image 230 including storage blocks 115 for transfer to the destination file system 120, so as to update the copy of the file system 114 at the destination file system 120.

If there is no such newest master snapshot 210, the system 100 performs volume copying for a full copy of the file system 114 represented by the newest master snapshot 210 at the file server 110. Similarly, if the oldest master snapshot 210 at the file server 110 is newer than the newest master snapshot 210 at the destination file system 120, the system 100 performs volume copying for a full copy of the file system 114.

After volume replication, the destination file system 120 updates its most recent master snapshot 210 to be the most recent master snapshot 210 from the file server 110.

Volume replication is well suited to uploading upgrades to a publicly accessible database, document, or web site. Those destination file systems 120, such as mirror sites, can then obtain the uploaded upgrades periodically, when they are initialized, or upon operator command at the destination file system 120. If the destination file systems 120 are not in communication with the file server 110 for a substantial period of time, when communication is re-established, the destination file systems 120 can perform volume replication with the file server 110 to obtain a substantially up-to-date copy of the file system 114.

In a first preferred embodiment of volume replication (herein called "simple replication"), the destination file system 120 communicates directly (using a direct communication link, a LAN, a WAN, or a combination thereof) with the file server 110.

In a second preferred embodiment of volume replication (herein called "multiple replication"), a first destination file system communicates directly (using a direct communication link, a LAN, a WAN, or a combination thereof) with a second destination file system. The second destination file system acts like the file server 110 to perform simple replication for the first destination file system.

A sequence of such destination file systems ultimately terminates in a destination file system that communicates directly with the file server 110 and performs simple replication. The sequence of destination file systems thus forms a replication hierarchy, such as in a directed graph or a tree of file severs 110.

In alternative embodiments, the system 100 can also perform one or more combinations of these techniques.

In a preferred embodiment, the file server 110 can maintain a set of pointers to snapshots 210, naming those snapshots 210 and having the property that references to the pointers are functionally equivalent to references to the snapshots 210 themselves. For example, one of the pointers can have a name such as "master," so that the newest master snapshot 210 at the file server 110 can be changed simultaneously for all destination file systems. Thus, all destination file systems can synchronize to the same master snapshot 210.

Shadow Snapshots

The system 100 includes the possibility of designating selected snapshots 210 as "shadow" snapshots 210.

As used herein, a "shadow snapshot" is a subset of a snapshot, the member storage blocks no longer forming a consistent file system. Thus, at one time the member storage blocks of the snapshot did form a consistent file system, but at least some of the member storage blocks have been removed from that snapshot.

A shadow snapshot 210 has the property that the file server 110 can reuse the storage blocks 115 in the snapshot 210 whenever needed. A shadow snapshot 210 can be used as the base of an incremental storage image 230. In such cases, storage blocks 115 might have been removed from the shadow snapshot 210 due to reuse by the file system 110. It thus might occur that the incremental storage image 230 resulting from logically subtraction using the shadow snapshot 210 includes storage blocks 115 that are not strictly necessary (having been removed from the shadow snapshot 210 they are not subtracted out). However, all storage blocks 115 necessary for the incremental storage image 230 will still be included.

For regular snapshots 210, the file server 110 does not reuse the storage blocks 115 in the snapshot 210 until the snapshot 210 is released. Even if the storage blocks 115 in the snapshot 210 are no longer part of the active file system, the file server retains them without change. Until released, each regular snapshot 210 preserves a consistent file system 114 that can be accessed at a later time.

However, for shadow snapshots 210, the file server 110 can reuse the storage blocks 115 in the shadow snapshot 210. When one of those storage blocks 115 is reused, the file server 110 clears the bit in the shadow snapshot 210 for that storage block 115. Thus, each shadow snapshot 210 represents a set of storage blocks 115 from a consistent file system 114 that have not been changed in the active file system 114 since the shadow snapshot 210 was made. Because storage blocks 115 can be reused, the shadow snapshot 210 does not retain the property of representing a consistent file system 114. However, because the file server 110 can reuse those storage blocks 115, the shadow snapshot 210 does not cause any storage blocks 115 on the mass storage 113 to be permanently occupied.

Method of Operation

Figure 3:
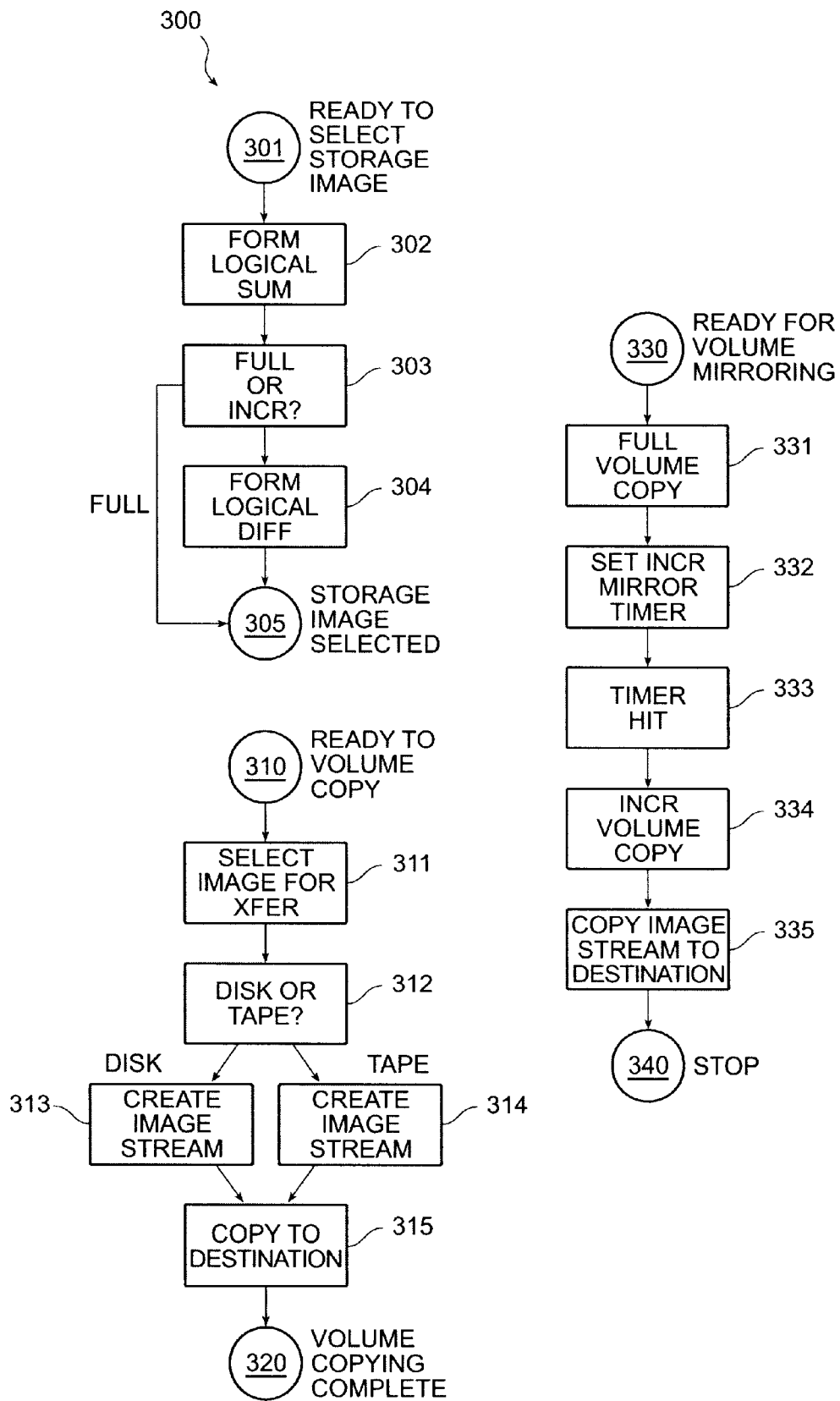
FIG. 3 shows a process flow diagram of a method for file system image transfer.
Figure 3:
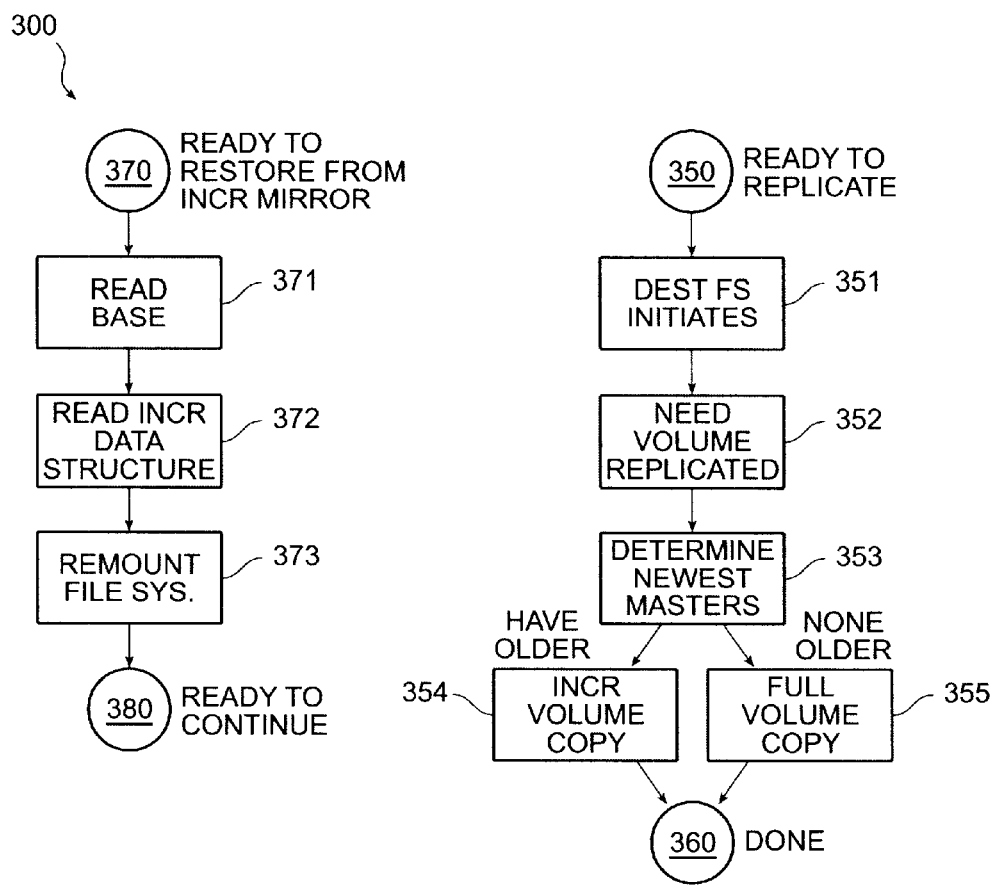

FIG. 3 shows a process flow diagram of a method for file system image transfer.

A method 300 is performed is performed by the file server 110 and the destination file system 120, and includes a set of flow points and process steps as described herein.

Generality of Operational Technique

In each of the file system image transfer techniques, the method 300 performs three operations:

Select a storage image 220, in response to a first file system (or a snapshot thereof) to have an operation performed thereon.

Form an image stream 230 in response to the storage image 220. Perform an operation on the image stream 230, such as backup or restore within the first file system, or copying or transfer to a second file system.

Reconstruct the first file system (or the snapshot thereof) in response to the image stream 230.

As shown herein, each of these steps is quite general in its application.

In the first (selection) step, the storage image 220 selected can be a complete file system or can be a subset thereof. The subset can be an increment to the complete file system, such as those storage blocks that have been changed, or can be another type of subset. The storage image 220 can be selected a single time, such as for a backup operation, or repeatedly, such as for a mirroring operation. The storage image 220 can be selected in response to a process at a sending file server or at a receiving file server.

For example, as shown herein, the storage image 220 selected can be for a full backup or copying of an entire file system, or can be for incremental backup or incremental mirroring of a file system. The storage image 220 selected can be determined by a sending file server, or can be determined in response to a request by a receiving file server (or set of receiving file servers).

In the second (operational) step, the image stream 230 can be selected so as to optimize the operation. The image stream 230 can be selected and ordered to optimize transfer to different types of media, to optimize transfer rate, or to optimize reliability. In a preferred embodiment, the image stream 230 is optimized to maximize transfer rate from parallel disks in a RAID disk system.

In the third (reconstruction) step, the image stream 230 can be reconstructed into a complete file system, or can be reconstructed into an increment of a file system. The reconstruction step can be performed immediately or after a delay, can be performed in response to the process that initiated the selection step, or can be performed independently in response to other needs.

Selecting A Storage Image

In each of the file system image transfer techniques, the method 300 selects a storage image 220 to be transferred.

At a flow point 301, the file server 110 is ready to select a storage image 220 for transfer.

At a step 302, the file server 110 forms a logical sum LS of a set of storage images 220 A1+A2, thus LS=A1+A2. The logical sum LS can also include any plurality of storage images 220, such as A1+A2+A3+A4, thus for example LS=A1+A2+A3+A4.

At a step 303, the file server 110 determines if the transfer is a full transfer or an incremental transfer. If the transfer is incremental, the method 300 continues with the next step. If the transfer is a full transfer, the method 300 continues with the flow point 380.

At a step 304, the file server 110 forms a logical difference LD of the logical sum LS and a base storage image 220 B, thus LD=LS−B. The base storage image 220 B comprises a snapshot 210.

At a flow point 305, the file server 110 has selected a storage image 230 for transfer.

Volume Copying

At a flow point 310, the file server 110 is ready to perform a volume copying operation.

At a step 311, the file server 111 selects a storage image 220 for transfer, as described with regard to the flow point 370 through the flow point 380. If the volume copying operation is a full volume copy, the storage image 220 selected is for a full transfer. If the volume copying operation is an incremental volume copy, the storage image 220 selected is for an incremental transfer.

At a step 312, the file server 110 determines if the volume is to be copied to disk or to tape.

If the volume is to be copied to disk, the method 300 continues with the step 313.

If the volume is to be copied to tape, the method 300 continues with the step 314.

At a step 313, the file server 110 creates an image stream 230 for the selected storage image 220. In a preferred embodiment, the storage blocks 115 in the image stream 230 are ordered for transfer to disk. Each storage block 115 is associated with a VBN (virtual block number) for identification. The method 300 continues with the step 315.

At a step 314, the file server 110 performs the same functions as in the step 313, except that the storage blocks 115 in the image stream 230 are ordered for transfer to tape.

At a step 315, the file server 110 copies the image stream 230 to the destination file system 120 (disk or tape).

If the image stream 230 is copied to disk, the file server 110 preferably places each storage block 115 in an equivalent position on the target disk(s) as it was on the source disk(s), similar to what would happen on retrieval from tape.

In a preferred embodiment, the file server 110 copies the image stream 230 to the destination file system 120 using a communication protocol known to both the file server 110 and the destination file system 120, such as TCP. As noted herein, the image stream 230 used with the communication protocol is similar to the image stream 230 used for tape backup, but can include additional messages or packets for acknowledgement or retransmission of data.

The destination file system 120 presents the image stream 230 directly to a restore element, which copies the image stream 230 onto the destination file system 120 target disk(s) as they were on the source disk(s). Because a consistent file system 114 is copied from the file server 110 to the destination file system 120, the storage blocks 115 in the image stream 230 can be used directly as a consistent file system 114 when they arrive at the destination file system 120.

The destination file system 120 might have to alter some inter-block pointers, responsive to the VBN of each storage block 115, if some or all of the target storage blocks 115 are recorded in different physical locations on disk from the source storage blocks 115.

If the image stream 230 is copied to tape, the file server 110 preferably places each storage block 115 in a position on the target tape so that it can be retrieved by its VBN. When the storage blocks 115 are eventually retrieved from tape into a disk file server 110, they are preferably placed in equivalent positions on the target disk(s) as they were on the source disk(s).

The destination file system 120 records the image stream 230 directly onto tape, along with a set of block number information for each storage block 115. The destination file system 120 can later retrieve selected storage blocks 115 from tape and place them onto a disk file server 110. Because a consistent file system 114 is copied from the file server 110 to the destination file system 120, the storage blocks 115 in the image stream 230 can be restored directly to disk when later retrieved from tape at the destination file system 120.

The destination file system 120 might have to alter some inter-block pointers, responsive to the VBN of each storage block 115, if some or all of the target storage blocks 115 are retrieved from tape and recorded in different physical locations on disk from the source storage blocks 115. The destination file system 120 recorded this information in header data that it records onto tape.

At a flow point 320, the file server 110 has completed the volume copying operation.

Volume Mirroring

At a flow point 330, the file server 110 is ready to perform a volume mirroring operation.

At a step 331, the file server 110 performs a full volume copying operation, as described with regard to the flow point 310 through the flow point 320. The volume copying operation is performed for a full copy of the file system 114.

If the function to be performed is full mirroring, the file server 110 performs the full volume copying operation to disk as the target destination file system 120.

If the function to be performed is incremental mirroring, the file server 110 performs the full volume copying operation to tape as the target destination file system 120.

At a step 332, the file server 110 sets a mirroring timer for incremental update for the volume mirroring operation.

At a step 333, the mirroring timer is hit, and the file server 110 begins the incremental update for the volume mirroring operation.

At a step 334, the file server 110 performs an incremental volume copying operation, as described with regard to the flow point 310 through the flow point 320. The volume copying operation is performed for an incremental upgrade of the file system 114.

The incremental volume copying operation is performed with disk as the target destination file system 120.

If the initial full volume copying operation was performed to disk, the destination file system 120 increments its copy of the file system 114 to include the incremental storage image 220.

If the initial full volume copying operation was performed to tape, the destination file system 120 records the incremental storage image 220 and integrates it into an incremental mirror data structure, as described above, for possibly later incrementing its copy of the file system 114.

At a step 335, the file server 110 copies the image stream 230 to the target destination file system 120. The method 300 returns to the step 332, at which step the file server 110 resets the mirroring timer, and the method 300 continues.

When the destination file system 120 receives the image stream 230, it records the storage blocks 115 in that image stream 230 similar to the process of volume copying, as described with regard to the step 315.

If the method 300 is halted (by an operator command or otherwise), the method 300 completes at the flow point 340.

At a flow point 340, the file server 110 has completed the volume mirroring operation.

Reintegration of Incremental Mirror

At a flow point 370, the file server 110 is ready to restore a file system from the base storage image 220 and the incremental mirror data structure.

At a step 371, the file server 110 reads the base storage image 220 into its file system.

At a step 372, the file server 110 reads the incremental mirror data structure into its file system and uses that data structure to update the base storage image 220.

At a step 373, the file server 110 remounts the file system that was updated using the incremental mirror data structure.

At a flow point 380, the file server 110 is ready to continue operations with the file system restored from the base storage image 220 and the incremental mirror data structure.

Volume Replication

At a flow point 350, the file server 110 is ready to perform a volume replication operation.

At a step 351, the destination file system 120 initiates the volume replication operation. The destination file system 120 sends an indicator of its newest master snapshot 210 to the file server 110, and requests the file server 110 to perform the volume replication operation.

At a step 352, the file server 110 determines if it needs to perform a volume replication operation to synchronize with a second file server 110. In this case, the second file server 110 takes the role of the destination file system 120, and initiates the volume replication operation with regard to the first file server 110.

At a step 353, the file server 110 determines its newest master snapshot 210, and its master snapshot 210 corresponding to the master snapshot 210 indicated by the destination file system 120.

If the file server 110 has at least one master snapshot 210 older than the master snapshot 210 indicated by the destination file system 120, it selects the corresponding master snapshot 210 as the newest one of those.

In this case, the method proceeds with the step 354.

If the file server 110 does not have at least one master snapshot 210 older than the master snapshot 210 indicated by the destination file system 120 (or if the destination file system 120 did not indicate any master snapshot 210), it does not select any master snapshot 210 as a corresponding master snapshot.

In this case, the method proceeds with the step 355.

At a step 354, the file server 110 performs an incremental volume copying operation, responsive to the incremental difference between the selected corresponding master snapshot 210, and the newest master snapshot 210 it has available. The method 300 proceeds with the flow point 360.

At a step 355, the file server 110 performs a full volume copying operation, responsive to the newest master snapshot 210 it has available. The method 300 proceeds with the flow point 360.

At a flow point 360, the file server 110 has completed the volume replication operation. The destination file system 120 updates its master snapshot 210 to correspond to the master snapshot 210 that was used to make the file system transfer from the file server 110.

Technical Appendix

A technical appendix, titled "WAFL Image Transfer," and having the inventors named as authors, forms a part of this specification, and is hereby incorporated by reference as if fully set forth herein.

Alternative Embodiments

Although preferred embodiments are disclosed herein, many variations are possible which remain within the concept, scope, and spirit of the invention, and these variations would become clear to those skilled in the art after perusal of this application.

What is claimed is:

1. A method for identifying storage blocks in a file system having a plurality of storage blocks, comprising the steps of:
identifying a first storage image indicating a first set of member storage blocks selected from the plurality, the first storage image including a first bit plane indicating which member storage blocks are in the first storage image;
identifying a second storage image indicating a second set of member storage blocks selected from the plurality, the second storage image including a second bit plane indicating which member storage blocks are in the second storage image;
performing a logical operation on the first bit plane and the second bit plane to determine a logical difference between the first storage image and the second storage image;
wherein at least the first storage image or the second storage image indicates member storage blocks forming a consistent file system other than an active file system.

2. A method for identifying storage blocks in a file system having a plurality of storage blocks, comprising the steps of:
identifying a first storage image indicating a first set of member storage blocks selected from the plurality, the first storage image including a first bit plane indicating which member storage blocks are in the first storage image;
identifying a second storage image indicating a second set of member storage blocks selected from the plurality, the second storage image including a second bit plane indicating which member storage blocks are in the second storage image;
performing a logical operation on the first bit plane and the second bit plane to determine a logical sum of the first storage image and the second storage image;
wherein at least the first storage image or the second storage image indicates member storage blocks forming a consistent file system other than an active file system.

3. A memory storing information including instructions, the instructions executable by a processor to identify storage blocks in a file system having a plurality of storage blocks, the instructions comprising:
identifying a first storage image indicating a first set of member storage blocks selected from the plurality, the first storage image including a first bit plane indicating which member storage blocks are in the first storage image;
identifying a second storage image indicating a second set of member storage blocks selected from the plurality, the second storage image including a second bit plane indicating which member storage blocks are in the second storage image;
performing a logical operation on the first bit plane and the second bit plane to determine a logical difference between the first storage image and the second storage image;
wherein at least the first storage image or the second storage image indicates member storage blocks forming a consistent file system other than an active file system.

4. A memory storing information including instructions, the instructions executable by a processor to identify storage blocks in a file system having a plurality of storage blocks, the instructions comprising:
identifying a first storage image indicating a first set of member storage blocks selected from the plurality, the first storage image including a first bit plane indicating which member storage blocks are in the first storage image;

identifying a second storage image indicating a second set of member storage blocks selected from the plurality, the second storage image including a second bit plane indicating which member storage blocks are in the second storage image;

performing a logical operation on the first bit plane and the second bit plane to determine a logical sum of the first storage image and the second storage image;

wherein at least the first storage image or the second storage image indicates member storage blocks forming a consistent file system other than an active file system.

5. An apparatus including:

a storage medium that stores a file system having a plurality of storage blocks;

a processor that executes instructions; and a memory that stores the instructions, the instructions executable by the processor to identify storage blocks in the file system, the instructions comprising: (a) identifying a first storage image indicating a first set of member storage blocks selected from the plurality, the first storage image including a first bit plane indicating which member storage blocks are in the first storage image, (b) identifying a second storage image indicating a second set of member storage blocks selected from the plurality, the second storage image including a second bit plane indicating which member storage blocks are in the second storage image, (c) performing a logical operation on the first bit plane and the second bit plane to determine a logical difference between the first storage image and the second storage image, wherein at least the first storage image or the second storage image indicates member storage blocks forming a consistent file system other than an active file system.

6. An apparatus including:

a storage medium that stores a file system having a plurality of storage blocks;

a processor that executes instructions; and a memory that stores the instructions, the instructions executable by the processor to identify storage blocks in the file system, the instructions comprising: (a) identifying a first storage image indicating a first set of member storage blocks selected from the plurality, the first storage image including a first bit plane indicating which member storage blocks are in the first blocks selected from the plurality, the second storage image including a second bit plane indicating which member storage blocks are in the second storage image, (c) performing a logical operation on the first bit plane and the second bit plane to determine a logical sum of the first storage image and the second storage image, wherein at least the first storage image or the second storage image indicates member storage blocks forming a consistent file system other than an active file system.

7. A method as in claim 1, wherein the first bit plane and the second bit plane each form a column of a collection of bit planes, each row in the collection representing a storage block.

8. A method as in claim 2, wherein the first bit plane and the second bit plane each form a column of a collection of bit planes, each row in the collection representing a storage block.

9. A memory as in claim 3, wherein the first bit plane and the second bit plane each form a column of a collection of bit planes, each row in the collection representing a storage block.

10. A memory as in claim 4, wherein the first bit plane and the second bit plane each form a column of a collection of bit planes, each row in the collection representing a storage block.

11. An apparatus as in claim 5, wherein the first bit plane and the second bit plane each form a column of a collection of bit planes, each row in the collection representing a storage block.

12. An apparatus as in claim 6, wherein the first bit plane and the second bit plane each form a column of a collection of bit planes, each row in the collection representing a storage block.

* * * * *